US009455595B2

(12) United States Patent
Jeon et al.

(10) Patent No.: US 9,455,595 B2
(45) Date of Patent: Sep. 27, 2016

(54) WIRELESS CHARGE SYSTEM IN DOOR POCKET OF VEHICLE

(71) Applicants: Hyundai Motor Company, Seoul (KR); Kia Motors Corporation, Seoul (KR); LG Innotek Co., Ltd., Seoul (KR)

(72) Inventors: Seul Ki Jeon, Jeollabuk-do (KR); Hyun Sang Kim, Gyeonggi-do (KR); Nam Woong Hur, Gyeonggi-do (KR); Yun Bok Lee, Seoul (KR); Yong Suk Chae, Gyeonggi-do (KR); Jeong Nam Son, Gyeonggi-do (KR); Woo Kil K. Jung, Gyeonggi-do (KR)

(73) Assignees: Hyundai Motor Company, Seoul (KR); Kia Motors Corporation, Seoul (KR); LG Innotek Co., Ltd., Seoul (KR)

( * ) Notice: Subject to any disclaimer, the term of this patent is extended or adjusted under 35 U.S.C. 154(b) by 162 days.

(21) Appl. No.: 14/565,727

(22) Filed: Dec. 10, 2014

(65) Prior Publication Data

US 2016/0013679 A1     Jan. 14, 2016

(30) Foreign Application Priority Data

Jul. 11, 2014    (KR) .......................... 10-2014-0087680

(51) Int. Cl.
*H02J 7/02*        (2016.01)
*H02J 7/00*        (2006.01)
*B60R 7/00*        (2006.01)

(52) U.S. Cl.
CPC ................. *H02J 7/025* (2013.01); *B60R 7/00* (2013.01); *H02J 7/0044* (2013.01); *H02J 7/0047* (2013.01)

(58) Field of Classification Search
CPC ............................. H02J 7/025; H02J 7/0044
USPC ......................................................... 320/108
See application file for complete search history.

(56) References Cited

U.S. PATENT DOCUMENTS

| 8,239,103 | B2 | 8/2012 | Ichihara |
| 9,096,177 | B2 * | 8/2015 | Boundy et al. ........... B60R 7/04 |
| 9,254,755 | B2 * | 2/2016 | Bachmaier et al. .. B60L 11/182 |

(Continued)

FOREIGN PATENT DOCUMENTS

| JP | 5120381 B2 | 1/2013 |
| JP | 2013-121251 A | 6/2013 |

(Continued)

*Primary Examiner* — Sun Lin
(74) *Attorney, Agent, or Firm* — Mintz Levin Cohn Ferris Glovsky and Popeo, P.C.; Peter F. Corless

(57) ABSTRACT

A wireless charge system includes a wireless charger configured to wirelessly transfer power to an apparatus including a battery in order to charge the battery; a fixing unit configured to fix the apparatus so that the apparatus cannot be moved separately from the wireless charger while wirelessly receiving the power from the wireless charger; and a display configured to provide an indication of a charged state of the battery, wherein the wireless charger, the fixing unit, and the display are formed in a door pocket included in a door of a vehicle.

9 Claims, 5 Drawing Sheets

(56) References Cited

U.S. PATENT DOCUMENTS

| | | | |
|---|---|---|---|
| 2009/0075704 A1* | 3/2009 | Wang | H02J 7/025 455/573 |
| 2010/0211272 A1 | 8/2010 | Ichihara | |
| 2012/0091948 A1* | 4/2012 | Shinde et al. | B60R 7/04 320/108 |
| 2013/0088195 A1* | 4/2013 | Yoon et al. | B60L 11/182 320/108 |
| 2014/0125277 A1* | 5/2014 | Van Wiemeersch et al. | H01M 10/44 320/108 |
| 2015/0171659 A1* | 6/2015 | Lee | H02J 17/00 320/108 |

FOREIGN PATENT DOCUMENTS

| | | |
|---|---|---|
| KR | 10-2009-0128450 A | 12/2009 |
| KR | 10-2011-0055903 A | 5/2011 |
| KR | 10-2013-0000246 A | 1/2013 |
| KR | 10-2013-0047722 A | 5/2013 |
| KR | 10-2014-0022540 A | 2/2014 |
| KR | 10-2014-0073672 A | 6/2014 |

\* cited by examiner

WIRELESS CHARGE SYSTEM IN DOOR POCKET OF VEHICLE

CROSS-REFERENCE TO RELATED APPLICATION

This application claims the benefit of and priority to Korean Patent Application No. 10-2014-0087680, filed on Jul. 11, 2014 in the Korean Intellectual Property Office, the disclosure of which is incorporated herein in its entirety by reference.

TECHNICAL FIELD

The present disclosure relates to a wireless charge system, and more particularly, to a wireless charge system including an apparatus capable of wirelessly charging power in a door pocket of a vehicle.

BACKGROUND

In general, a majority of wireless communication devices need to be charged. Notably, many wireless communication devices have different types of wired-connectors. For example, an electrical connection scheme between a battery pack used in a portable wireless communication device and a charger for charging the battery pack with electric energy can include receiving commercial power, converting the commercial power into a voltage and a current corresponding to the battery pack, and supplying the electric energy to the battery pack through terminals of the battery pack. However, the above-mentioned connection scheme necessarily requires wires connecting between the charger and the portable communication device and also requires a user to connect the corresponding wires.

Therefore, in order to overcome the inconvenience caused by a wired charging system (e.g., as described above), wireless charge technologies have been recently developed. In particular, wireless charge systems have been mounted in vehicles so that a portable wireless communication device may be wirelessly charged in the vehicle. Such non-contact wireless charge systems for a vehicle are generally mounted in a center console located between a driver seat and a passenger seat of the vehicle. As a result, problems arise in that space for wires formed in the center console is lacking, and the attention of the driver may be diverted during driving. In addition, an inconvenience is caused when the driver, a passenger in the passenger seat, and a passenger in a rear seat all desire to use the wireless charge system at once.

SUMMARY

The present disclosure has been made to solve the above-mentioned problems occurring in the related art while advantages achieved by the related art are maintained intact.

An aspect of the present disclosure provides a wireless charge system capable of wirelessly charging a portable wireless communication device by utilizing a door pocket located in a vehicle door having spare space for wires. An aspect of the present disclosure also provides a wireless charge system capable of informing a passenger (e.g., using an alarm) to not get out of a vehicle when a portable wireless communication device is left in the vehicle in the middle of a wireless charge of the portable wireless communication device utilizing the aforementioned door pocket.

According to embodiments of the present disclosure, a wireless charge system includes: a wireless charger configured to wirelessly transfer power to an apparatus including a battery in order to charge the battery; a fixing unit configured to fix the apparatus so that the apparatus cannot be moved separately from the wireless charger while wirelessly receiving the power from the wireless charger; and a display configured to provide an indication of a charged state of the battery, wherein the wireless charger, the fixing unit, and the display are formed in a door pocket included in a door of a vehicle.

The fixing unit may be any one of a seal formed of rubber, in which a rubber plate is cut in a predetermined direction, a net having restoring force, and a slot of a sliding scheme.

The display may provide the indication of the charged state of the battery by emitting a light or by outputting a sound, the charged state being a state in which the battery is being charged or a state in which the charge of the battery is completed.

In a case of the door is included at all seats of the vehicle, the display may provide the indication of the charged state of the battery through a cluster included in the vehicle, the charged state being a state in which the battery is being charged or a state in which the charge of the battery is completed.

In a case in which a door open signal allowing the door of the vehicle to be opened is sensed when the apparatus is fixed on the fixing unit, the display may emit a flickering light or output an alarm sound, so as to discourage a user of the apparatus from getting out of the vehicle when the apparatus is left in the vehicle.

In a case in which a door open signal allowing the door of the vehicle to be opened is sensed when the apparatus is fixed on the fixing unit, the wireless charge system may perform an action that prevents the door of the vehicle from opening.

The wireless charge system may inform a head unit of the vehicle, through a controller area network (CAN) communication, of one or more of: whether or not the apparatus is present and the charged state of the battery.

The wireless charger, the fixing unit, and the display may be formed in a housing which is attachable to and detachable from the door pocket, and the housing may be mounted in or separated from the door pocket.

The wireless charge system may indicate, to a head unit of the vehicle or a cluster of the vehicle, whether the door pocket having the housing mounted therein or separated therefrom is in any door of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
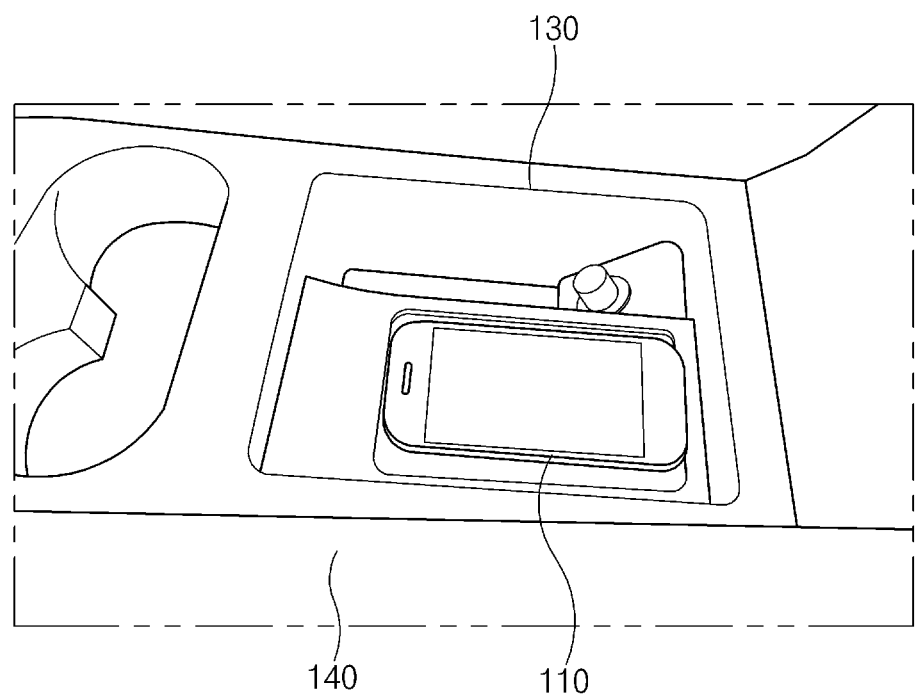
FIG. 1 is a view illustrating a wireless charge system mounted in a center console generally located between a driver seat and a passenger seat of a vehicle.

Advantages and features of the present disclosure and methods to achieve them will be described from embodiments described below in detail with reference to the accompanying drawings. However, the present disclosure is not limited to the embodiments set forth herein, but may be modified in many different forms. Merely, the embodiments of the present disclosure will be provided to describe in detail so that those skilled in the art may easily implement the spirit of the present disclosure.

In the drawings, the embodiments of the present disclosure are not limited to specific forms, but are exaggerated for clarity. In the present specification, specific terms have been used, but are just used for the purpose of describing the present disclosure and are not used for qualifying the meaning or limiting the scope of the present disclosure, which is disclosed in the appended claims.

In the present specification, an expression 'and/or' is used as a meaning including at least one of components listed before and after the expression. In addition, an expression 'connected to or coupled to' is used as a meaning including a case in which one component is directly connected to another component or is indirectly connected through another component. Unless explicitly described to the contrary, a singular form includes a plural form in the present specification. In addition, components, steps, operations, and/or elements mentioned by 'comprise' or 'comprising' used in the present specification mean the existence or addition of one or more other components, steps, operations, and/or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, embodiments of the present disclosure will be described in detail with reference to the accompanying drawings.

FIG. 1 is a view illustrating a wireless charge system mounted in a center console generally located between a driver seat and a passenger seat of a vehicle.

Referring to FIG. 1, a smartphone 110, which is an apparatus including a charging battery, is shown, and the smartphone 110 is placed on a center console 140 located between a driver seat and a passenger seat in a vehicle. Specifically, the center console includes a wireless charger 130 charging the charging battery by wirelessly transferring power to the charging battery included in the smartphone 110. In the wireless charge system as shown in FIG. 1, the smartphone 110 which is on the wireless charger 130 is exposed to a vibration or shaking which is caused by driving of the vehicle. In this case, wireless charge efficiency may be decreased.

In addition, since the center console 140 included in the vehicle is generally used as a space where articles carried by a passenger are placed or kept, in the case in which it includes the wireless charger 130 as illustrated in FIG. 1, the available space provided to the passenger of the vehicle becomes insufficient. In addition, in the case in which the wireless charge system is included in the center console 140, there are problems that a separate wiring space for the wireless charge system is required in the center console 140, and a passenger seated in a rear seat also needs to approach the center console 140 to wirelessly charge the smartphone 110 carried by himself.

In view of the above shortcomings, the present disclosure forms the wireless charge system in a door pocket included in a door of the vehicle rather than in the center console 140 in order to solve the above-mentioned problems. As a result, each of the passengers of the vehicle may wirelessly charge his or her own smartphone 110 using the door pocket included in the door which is closest to himself. Also, the center console 140 included in the vehicle may still be comfortably used as a space for keeping other articles, thereby generating additional space in the center console 140. Further, since the smartphone 110 can be mounted such that half or more of the smartphone 110 is buried in the door pocket, it is possible to prevent a vibration generated by driving of the vehicle from decreasing charge efficiency.

Figure 2:
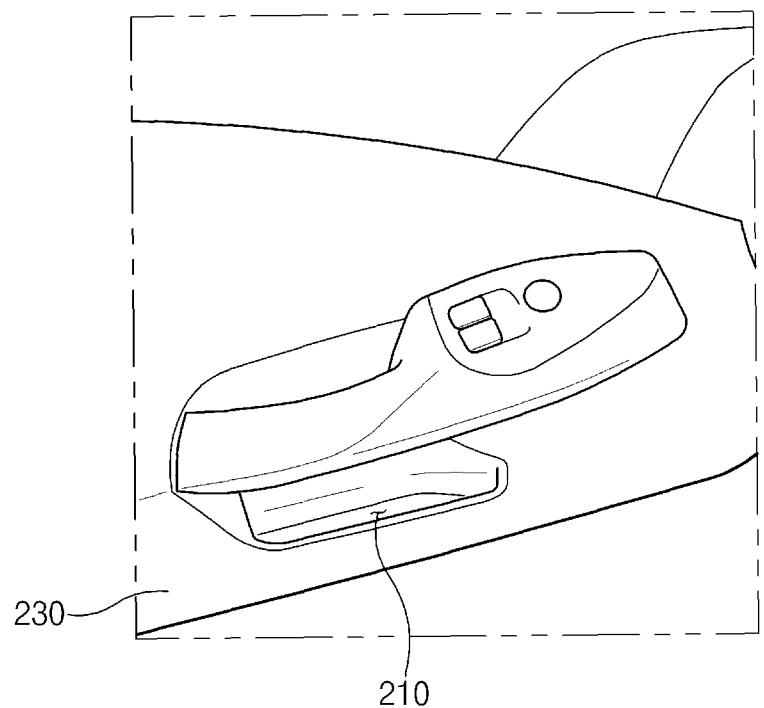
FIG. 2 is a view illustrating a door pocket included in a vehicle door.

FIG. 2 is a view illustrating a door pocket included in a vehicle door. Referring to FIG. 2, a door pocket 210 in which the vehicle passenger may load articles is provided in a door 230 of a vehicle. In general, the door pocket 210 is provided in a lower end of the door 230, but the door pocket 210 according to the present disclosure is not limited thereto.

Figure 3:
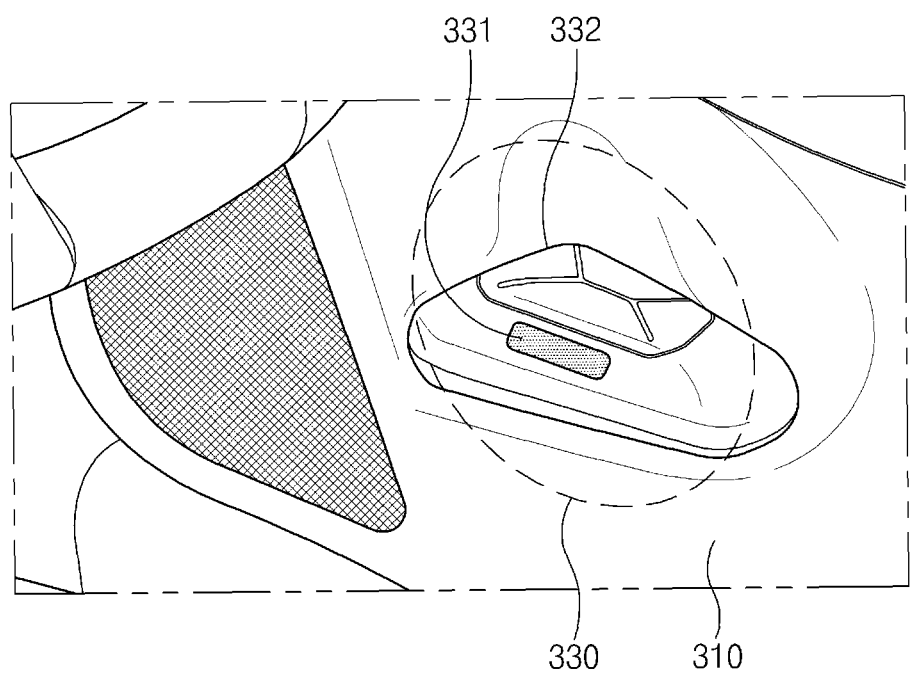
FIG. 3 is a view illustrating a wireless charge system according to embodiments of the present disclosure.

FIG. 3 is a view illustrating a wireless charge system according to embodiments of the present disclosure. Referring to FIG. 3, a wireless charge system 330 is formed (or mounted) in a door pocket included in a vehicle door 310. In addition, the wireless charge system 330 includes a display 331 displaying a charged state of the battery, a fixing unit 332 fixing a smartphone including the battery, and a wireless charger (although not shown) included in the wireless charge system 330.

First, describing the wireless charger, the wireless charger charges the battery included in the smartphone by wirelessly transferring power to an apparatus (hereinafter, referred to as "smartphone") including a charging battery. Here, the wireless charger may include a wireless charger pad capable of using both of a magnetic resonance type and a magnetic induction type.

The display 331 provides an indication (e.g., to a person) of a charged state of the battery included in the smartphone which is fixed to the wireless charge system 330. Here, the charged state includes whether or not the battery of the smartphone is in a state of being charged, or is in a state in which the charge is completed, and may also include a degree of charge progress. In addition, a scheme informing the outside includes a visual scheme or an auditory scheme.

Specifically, in a case in which the display 331 includes a device emitting light, such as a light emitting diode (LED), light colors emitted by the corresponding LED may be classified according to the charged state of the battery to thereby be emitted (e.g., to a vehicle passenger). In addition, in the case in which the display 331 is operated together with a speaker included in the vehicle, or the display 331 itself includes a speaker capable of outputting a sound, the display 331 may classify and output a pre-stored sound, such as a voice-based sound, for example, according to the charged state of the battery. For example, the pre-stored voice-based sound may include "in charging" or "charging is completed." In addition, in the case in which the wireless charge system 330 is formed in the door provided to a driver seat of the vehicle, the display 331 may inform a person of the charged state of the battery through a cluster included in the vehicle in order to prevent dispersion of a driver's view during a driving.

The fixing unit 332 fixes the smartphone so that the smartphone receiving power from the wireless charger is not separated from the wireless charging pad (not shown) included in the wireless charger by a vibration, or the like, generated due to the driving of the vehicle. That is, the fixing unit 332 fixes the smartphone so that the smartphone is not moved separately (i.e., independently) from the wireless charger due to the vibration of the vehicle, or the like.

The wireless charger, the fixing unit 332, and the display 331 included in the wireless charge system according to embodiments of the present disclosure are formed in the door pocket (or an interior thereof) included in the vehicle door 310, as shown in FIG. 3. Therefore, each of the vehicle passengers may use the wireless charge system formed in the door pocket of the vehicle door located around them and the center console may have a spare space in which other articles, and the like may be loaded.

In addition, the wireless charger, the fixing unit 332, and the display 331 may be formed in a housing form. Here, the housing may be attached to or detached from the door pocket of the vehicle door. As a result, the wireless charger, the fixing unit 332, and the display 331 which enable the wireless charge may be mounted on a door of a driver seat and may be then again separated to be mounted on a door of a passenger seat or all seats. As a result, even in the case in which the wireless charger, the fixing unit 332, and the display 331 are not formed in all doors of the vehicle, they may freely provide the wireless charge to the passenger seated on other seats.

Figure 4:
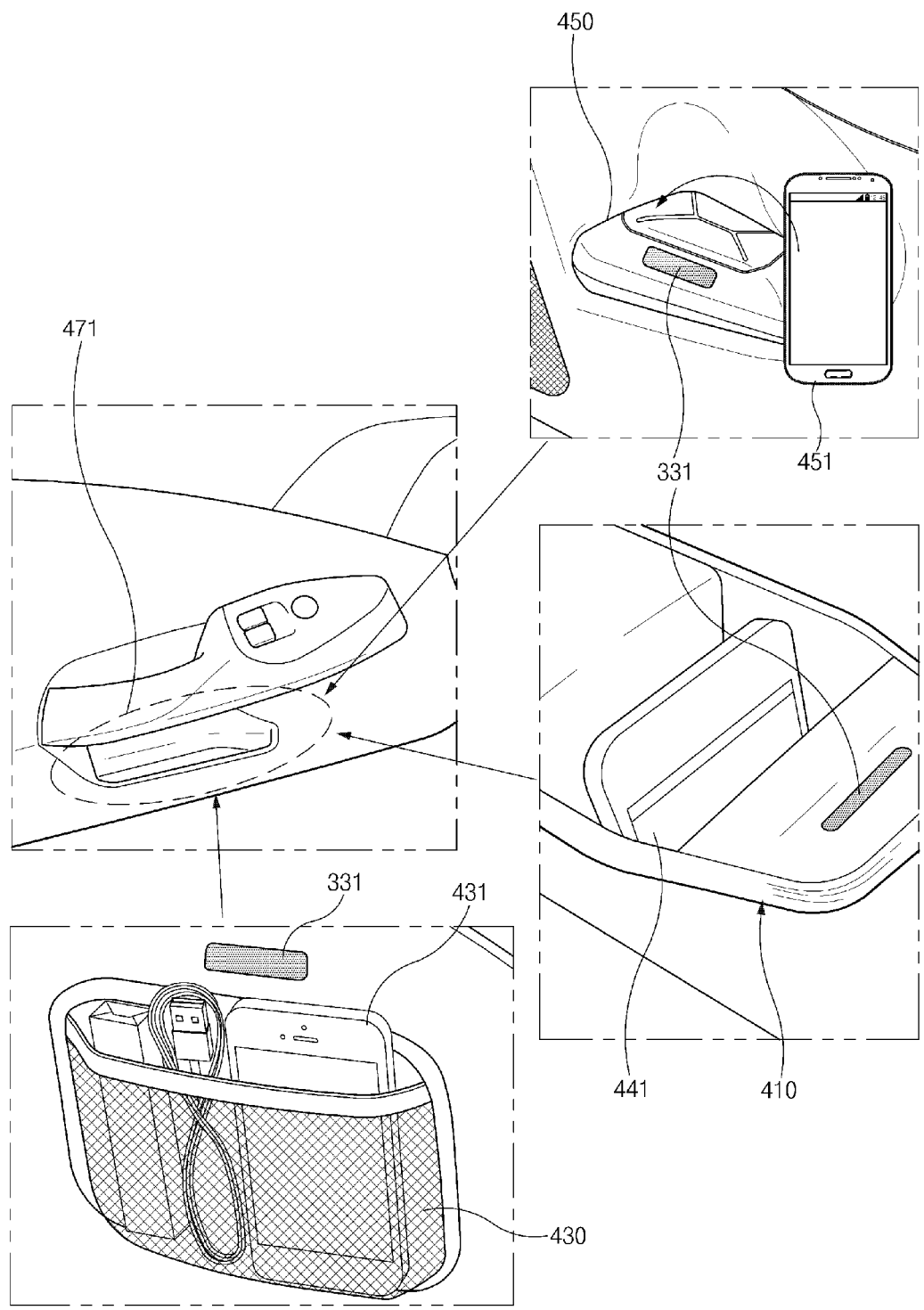
FIG. 4 is a view illustrating a wireless charge system according to embodiments of the present disclosure.

FIG. 4 is a view illustrating a wireless charge system according to embodiments of the present disclosure. Referring to FIG. 4, three wireless charge systems are shown as specific examples. However, it is apparent that the wireless charge system according to embodiments of the present disclosure is not limited thereto.

The fixing unit included in a first wireless charge system 410 is configured in a slot form of a sliding scheme. Specifically, a smartphone 441 is held in an inner space of the wireless charge system 410 formed in a door pocket 471 and is aligned with the wireless charger to be fixed. Therefore, the smartphone 441 is held by the slot of the sliding scheme, such that it may be unaffected by a vibration of the vehicle and efficiently receive power from the wireless charger.

The fixing unit included in a second wireless charge system 430 is configured in a net form formed of a material having restoring force. Specifically, a smartphone 431 is aligned with the wireless charger to be held in a form enclosed by a net formed in the door pocket 471. As a result, the smartphone 431 may be unaffected by a vibration of the vehicle and efficiently receive power from the wireless charger.

The fixing unit included in a third wireless charge system 450 is configured in a seal form formed by cutting a material such as a rubber plate having elastic force in a predetermined direction. Specifically, the cut rubber plate is formed over the door pocket 471 in a form covering the door pocket 471, and a smartphone 451 is inserted into the formed gap and is aligned with the wireless charger to be held. Similarly, as a result, the smartphone 451 may be unaffected by a vibration of the vehicle and efficiently receive power from the wireless charger.

All of the three wireless charge systems 410, 430, and 450 include the display 331, which informs the outside of the charged state of the battery included in the smartphone in the visual scheme or the auditory scheme as described above with reference to FIG. 3.

Addition, the above-mentioned three types of wireless charge systems 410, 430, and 450 may be appropriately applied depending on a class of a vehicle to which they are to be provided. For example, in case of a luxury vehicle model, the wireless charge system is implemented in the slot form of the sliding scheme and in case of a medium and low priced vehicle model, the wireless charge system is implemented in the cut rubber plate seal or net form, such that it may affect production cost and sales cost of the vehicle.

Figure 5:
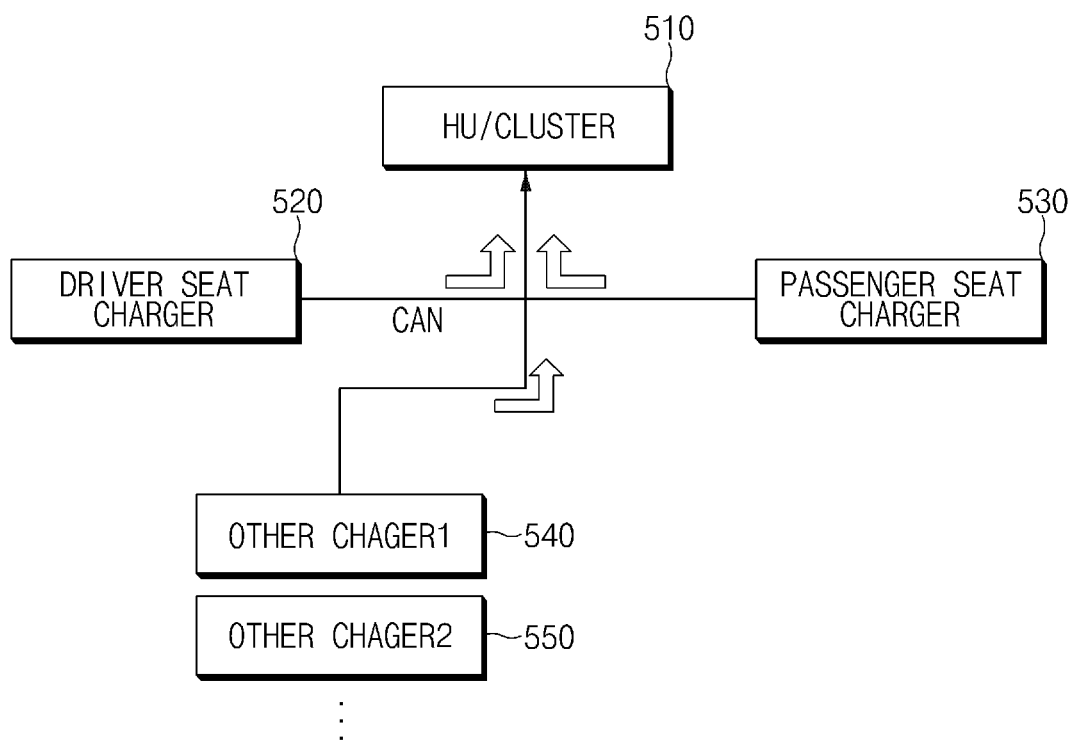
FIG. 5 is a view illustrating a connection relationship between the respective apparatuses in the wireless charge system according to embodiments of the present disclosure.

FIG. 5 is a view illustrating a connection relationship between the respective apparatuses in the wireless charge system according to embodiments of the present disclosure.

Referring to FIG. 5, the wireless charge system includes a driver seat charger 520, a passenger seat charger 530, the other charger 1 540, the other charger 550, and a head unit and cluster 510. Here, the other charger_1 540 and the other charger_2 550 may be charger formed in the door pockets included in doors of the rear seat. In addition, the respective components 510, 520, 530, 540 and 550 may be connected to one another through a controller area network (CAN) communication.

The respective chargers 520, 530, 540, and 550 may inform the head unit and cluster 510 whether or not they hold (include) a wireless charging target apparatus such as the smartphone including the battery through the CAN communication. In addition, the respective chargers 520, 530, 540, and 550 may also inform the head unit and cluster 510 of information about the charged state of the battery included in the held wireless charging target apparatus. In addition, in the case in which the wireless charger, the fixing unit, and the display are formed in the housing, the respective chargers 520, 530, 540, and 550 may also transfer information about whether the door pocket having the housing mounted therein or separated therefrom is in any door included in the vehicle to the head unit and cluster 510 through the CAN communication.

In addition, the wireless charge system according to the present disclosure may discourage the passenger of the vehicle from getting out of the vehicle in a state in which the smartphone held to perform the wireless charge is left in the vehicle. Specifically, in the case in which a user of the smartphone attempts to open the door of the vehicle to get out of the vehicle (that is, in the case in which a door open signal allowing the door of the vehicle to be opened is sensed), in a state in which the smartphone is fixed on the fixing unit to perform the wireless charge, the display may visually call a passenger's attention by flickering light emitted at a predetermined interval or may acoustically call the passenger's attention by outputting an alarm sound. The passenger receiving the visual or acoustic notice may recognize a fact that he or she should not exit the vehicle in a state in which the smartphone is fixed (e.g., while the smartphone is being charged). As another example, in the case in which the door open signal allowing the door of the vehicle to be opened is sensed in a state in which the smartphone is fixed on the fixing unit to perform the wireless charge, the wireless charge system according to the present disclosure may perform a control so that the door of the vehicle cannot be opened. Also, in this case, the passenger may recognize a fact that he or her gets out of the vehicle in the state in which the smartphone is left in the vehicle.

As a result, since the wireless charge system according to embodiments of the present disclosure allows for spare space in the center console and is formed in the door pockets included in the vehicle doors having proper accessibility to all passengers of the vehicle, spare space may also be created in the wiring space of the center console, the center console may maintain its original purpose of keeping other articles, and all passengers of the vehicle may conveniently and wirelessly charge their smartphone, or the like.

As described above, the wireless charge system according to embodiments of the present disclosure may wirelessly charge the portable wireless communication device utilizing the door pocket in the space located around the passenger of the vehicle and is located in a vehicle door that has spare space for wires. In addition, the wireless charge system according to embodiments of the present disclosure may inform the passenger of the alarm so as not to get out of a vehicle in a state in which the portable wireless communication device is left when the passenger gets out of the vehicle in the course of the wireless charge of the portable wireless communication device utilizing the door pocket located in the vehicle door.

Hereinabove, although the present disclosure has been described with reference to embodiments thereof, those skilled in the art will appreciate that various modifications, additions and substitutions of the present disclosure are possible without departing from the scope and spirit of the present disclosure. Accordingly, the scope of the present disclosure is not construed as being limited to the described embodiments but is defined by the appended claims as well as equivalents thereto. Considering the contents as described above, if modifications and alterations of the present disclosure are included in the following claims and a scope equivalent thereto, it is considered that the present disclosure includes these modifications and alterations thereof.

What is claimed is:

1. A wireless charge system comprising:
a wireless charger configured to wirelessly transfer power to an apparatus including a battery in order to charge the battery;
a fixing unit configured to fix the apparatus so that the apparatus cannot be moved separately from the wireless charger while wirelessly receiving the power from the wireless charger; and
a display configured to provide an indication of a charged state of the battery,
wherein the wireless charger, the fixing unit, and the display are formed in a door pocket included in a door of a vehicle.

2. The wireless charge system according to claim 1, wherein the fixing unit is any one of a seal formed of rubber in which a rubber plate is cut in a predetermined direction, a net having restoring force, and a slot of a sliding scheme.

3. The wireless charge system according to claim 1, wherein the display provides the indication of the charged state of the battery by emitting a light or by outputting a sound, the charged state being a state in which the battery is being charged or a state in which the charge of the battery is completed.

4. The wireless charge system according to claim 1, wherein in a case of the door is included at all seats of the vehicle, the display provides the indication of the charged state of the battery through a cluster included in the vehicle, the charged state being a state in which the battery is being charged or a state in which the charge of the battery is completed.

5. The wireless charge system according to claim 1, wherein in a case in which a door open signal allowing the door of the vehicle to be opened is sensed when the apparatus is fixed on the fixing unit, the display emits a flickering light or outputs an alarm sound, so as to discourage a user of the apparatus from getting out of the vehicle when the apparatus is left in the vehicle.

6. The wireless charge system according to claim 1, wherein in a case in which a door open signal allowing the door of the vehicle to be opened is sensed when the apparatus is fixed on the fixing unit, the wireless charge system performs an action that prevents the door of the vehicle from opening.

7. The wireless charge system according to claim 1, wherein the wireless charge system informs a head unit of the vehicle, through a controller area network (CAN) communication, of one or more of: whether or not the apparatus is present and the charged state of the battery.

8. The wireless charge system according to claim 1, wherein the wireless charger, the fixing unit, and the display are formed in a housing which is attachable to and detachable from the door pocket, and the housing is mounted in or separated from the door pocket.

9. The wireless charge system according to claim 8, wherein the wireless charge system indicates, to a head unit of the vehicle or a cluster of the vehicle, whether the door pocket having the housing mounted therein or separated therefrom is in any door of the vehicle.

* * * * *